United States Patent [19]
Shank

[11] 3,786,890
[45] Jan. 22, 1974

[54] SNOWMOBILE MUFFLER AND HEADER ASSEMBLY

[75] Inventor: Gerald G. Shank, Roseau, Minn.

[73] Assignee: Textron Inc., Providence, R.I.

[22] Filed: Dec. 20, 1971

[21] Appl. No.: 209,563

[52] U.S. Cl. ................ 180/64 A, 60/314, 180/5 R
[51] Int. Cl. ........................................... B60k 13/04
[58] Field of Search .... 180/64 A, 5 R; 60/314, 312, 60/313; 181/33 K, 36 B

[56] References Cited
UNITED STATES PATENTS

| | | | |
|---|---|---|---|
| 2,695,630 | 11/1954 | Klein et al. | 180/64 A X |
| 2,841,951 | 7/1958 | Whitcomb | 60/313 |
| 2,925,874 | 2/1960 | Norrie | 180/64 A |
| 2,940,249 | 6/1960 | Gospodar | 60/312 |
| 3,063,741 | 11/1962 | Bockerman | 180/64 A X |
| 3,064,417 | 11/1962 | Tryhorn et al. | 60/312 X |
| 3,491,534 | 1/1970 | Garner | 60/313 |
| 3,670,844 | 6/1972 | Penfold, Jr. | 60/313 X |
| 3,692,006 | 9/1972 | Miller et al. | 60/314 X |
| 3,695,238 | 10/1972 | Boerma | 60/313 X |
| 3,698,497 | 10/1972 | Bombardier | 180/5 R |

FOREIGN PATENTS OR APPLICATIONS 363,382  12/1931  Great Britain ................ 60/313

OTHER PUBLICATIONS

"Think of it as a Blue Ferrari;" Speedway; Mansfield, Ohio.

"Power-Tuned Mufflers;" Donaldson Company, Inc. Minneapolis, Minn. Copyright 1970.

Primary Examiner—Kenneth H. Betts
Assistant Examiner—David M. Mitchell
Attorney, Agent, or Firm—Paul A. Welter

[57] ABSTRACT

A muffler assembly for a three-cylinder two-cycle snowmobile engine is shown. The assembly is designed to optimize engine output over a broad RPM range while providing improved noise attenuation. Three tubes of generally equal length are connected to the exhaust ports of the engine, and the tubes are connected together into one end of a common joint, which is connected to an exhaust inlet tube of a muffler body having two spaced exhaust outlet tubes.

2 Claims, 6 Drawing Figures

PATENTED JAN 22 1974 3,786,890

INVENTOR.
GERALD G. SHANK
BY
MERCHANT & GOULD
ATTORNEYS

INVENTOR.
GERALD G. SHANK
BY
MERCHANT & GOULD
ATTORNEYS

SNOWMOBILE MUFFLER AND HEADER ASSEMBLY

BACKGROUND OF THE INVENTION

1. Field of the Invention: This invention relates generally to snowmobile muffler assemblies, and more particularly relates to the construction of a combined muffler and exhaust header assembly designed for connection to the exhaust ports of a three-cylinder two-cycle snowmobile engine.

2. Description of the Prior Art: Most snowmobiles being manufactured today utilize two-cycle engines because of their favorable power-to-weight ratio. During the initial years of snowmobile development, consumers were more interested in high performance than in silent machines. At the present time, however, public groups and governmental agencies are demanding the production of quieter machines. Although a snowmobile has many different sources of noise, the most noise emanates from the engine exhaust. It is not difficult to design a muffler to adequately reduce exhaust noise, but a muffler system, if not properly designed, will substantially reduce engine performance. It is well known in the art that the type of exhaust system selected can significantly affect two-cycle engine performance. Therefore, it would be desirable to have a muffler assembly that would not only attenuate exhaust noise but would also enhance engine performance.

Various types of exhaust systems have been used with two-cycle engines to enhance performance. It is known, for example, that straight pipes, megaphones, and tuned pipes result in different engine output characteristics. The theory of designing and using these various exhaust systems has been fairly well developed. These various systems and their theories of operation are disclosed in an article entitled "Better Breathing Improves Two-Stroke Engine Power" by Benjamin J. Shaeffer of the Homelite Division, Textron Inc., in the SAE Journal, July 1970. This article also indicates that the desired pressure sequence at the engine exhaust port can be achieved in a three-cylinder engine by closely connecting the three exhausts into one manifold. The article states that "The exhaust port of each cylinder opens just before the one on the preceding cylinder closes. By closely connecting the three exhausts into one manifold, the pressure of each blowdown pulse reaches the preceding cylinder at the correct time to produce supercharging. Moreover, this effect is relatively insensitive to engine speed. This method is called 'pulse charging'." The article does not disclose any particular structure for accomplishing this pulse charging.

SUMMARY OF THE INVENTION

I have designed a muffler system for a three-cylinder two-cycle engine that will enhance performance through the utilization of pulse charging while at the same time providing substantial noise attenuation. I have found that in order to obtain good performance, it is necessary ot utilize an exhaust header comprising three tubes of similar size and length each having one end connected to an exhaust port, with the other ends being connected together into a common joint leading to the muffler. Engine performance is further enhanced by having an exhaust inlet tube of predetermined length connected between the common joint and the muffler body. A pair of exhaust outlet tubes extend from the muffler body to discharge the exhaust gases.

The present invention appears to have both the desirable effects of a megaphone, which tends to improve engine output across a wide RPM range, and of a tuned pipe, which tends to provide a much higher engine output over a relatively narrow range of RPMs. The present invention achieves almost the peak power performance of an engine having a tuned pipe while retaining the broad range characteristics of a megaphone.

DESCRIPTION OF THE PREFERRED EMBODIMENT

Figure 1:
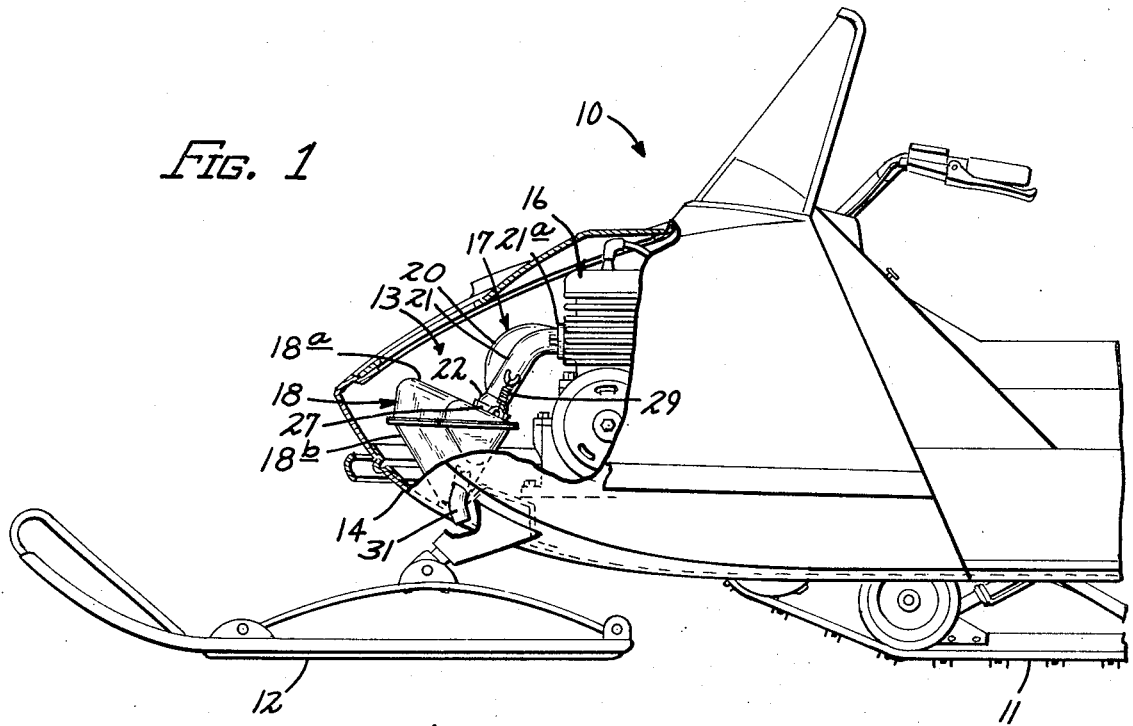
FIG. 1 is a view in side elevation of a snowmobile having a three-cylinder two-cycle engine and a muffler system according to the present invention, portions thereof being broken away and portions being shown in section.

Referring now to the drawings wherein like reference numerals will be used throughout the several views to indicate like elements of the invention, there is disclosed in FIG. 1 a snowmobile 10 having a drive track 11, steerable front ski means 12 and a forwardly located engine compartment 13 having a lower wall 14. Mounted in the engine compartment 13 is a three-cylinder two-cycle engine 16 with each of the cylinders having separate exhaust ports. Mounted in front of the engine 16, in compartment 13, is a muffler assembly including an exhasut header unit 17 and a muffler body 18.

Figure 4:
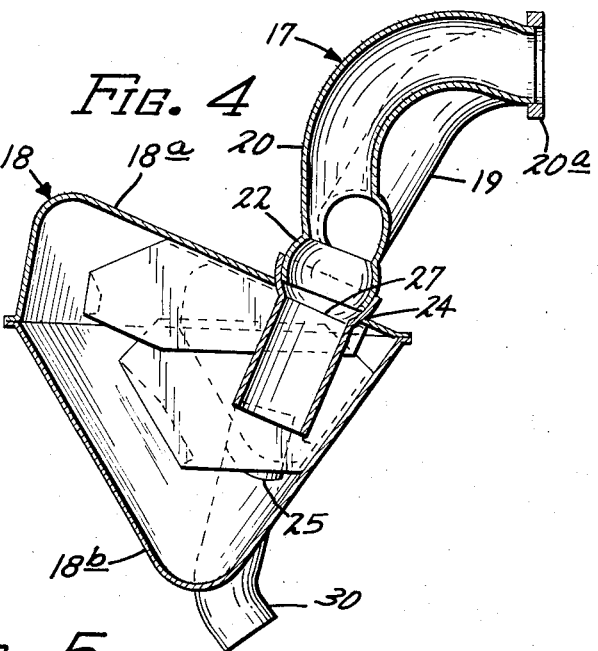
FIG. 4 is an enlarged sectional view taken along line 4—4 of FIG. 2, portions thereof having been removed.
Figure 5:
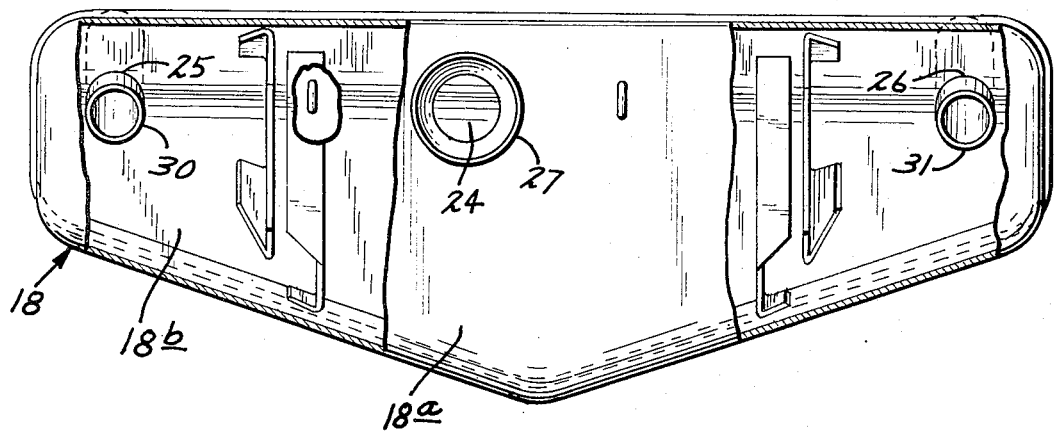
FIG. 5 is a top view of the muffler body, portions thereof being removed.

The header unit 17 comprises three tubes 19, 20 and 21 of substantially equal diameter and length, each having one end connected to one of the exhaust ports by suitable flanges 19a, 20a and 21a, respectively. The other ends of the three tubes are connected together into a common tubular joint 22 having an upper inlet opening and a lower outlet opening as shown in FIG. 4. Common joint 22 is constructed generally in the form of a truncated sphere, and in particular, that portion of a sphere remaining between two intersecting parallel planes positioned equal distances from the center. Referring to FIG. 4, if the common joint 22 can be considered to have an imaginary axis extending through the center of the inlet and outlet openings thereof, the three header tubes 19, 20 and 21 are connected to the upper inlet opening of the common joint 22 at acute angles with respect to the upwardly extending portion of the axis. Preferably, the angle between this upwardly extending portion of the imaginary axis and any one of the tubes 19, 20 and 21 will be 45 degrees or less. The exhaust gases being discharged by each of the tubes 19, 20 and 21 is thus directed primarily downwardly through common joint 22 rather than toward one of the other tube openings. It is again noted that the tubes 19, 20 and 21 are of substantially equal length so that the scavenging effects and pulse charging effects on the three cylinders will be substantially equal.

The elongated, hollow muffler body 18 extends transversely of the compartment 13 in front of the engine 16. The shape and configuration of the muffler body 18 is such that it will conveniently fit into the available space in compartment 13. Muffler body 18 has a top wall portion 18a and a bottom wall portion 18b connected together to form a sealed chamber. A centrally located exhaust intake opening 24 is formed in top wall portion 18a and a pair of exhaust outlet openings 25 and 26 are formed in bottom wall portion 18b adjacent the opposite ends of the muffler body 18.

Figure 2:
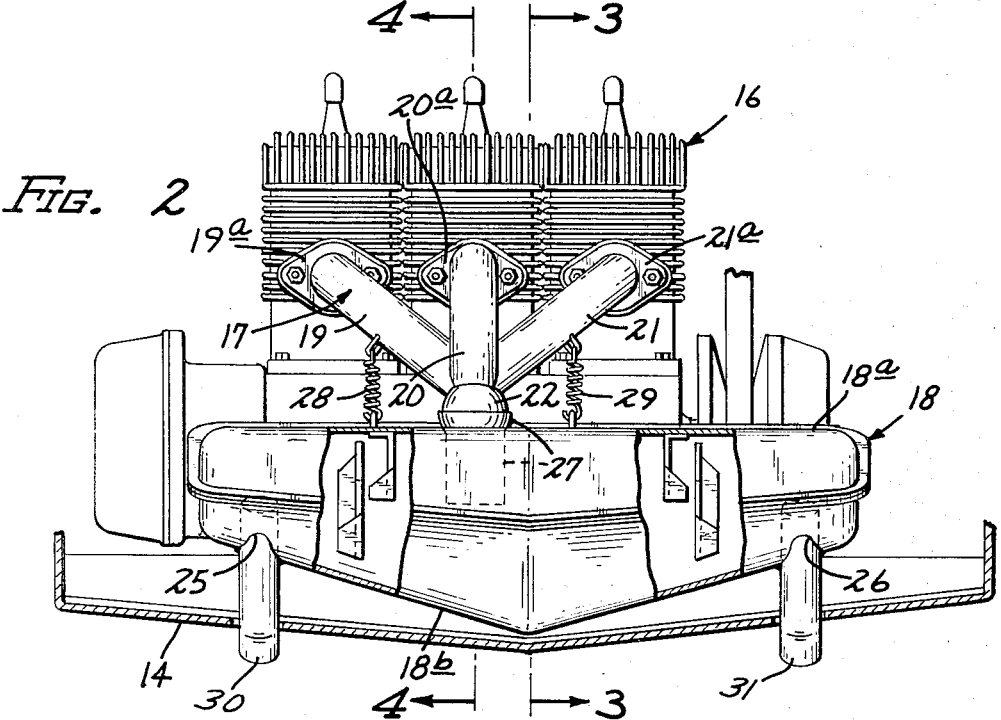
FIG. 2 is an enlarged view from the front, of the engine and muffler assembly shown in FIG. 1.
Figure 3:
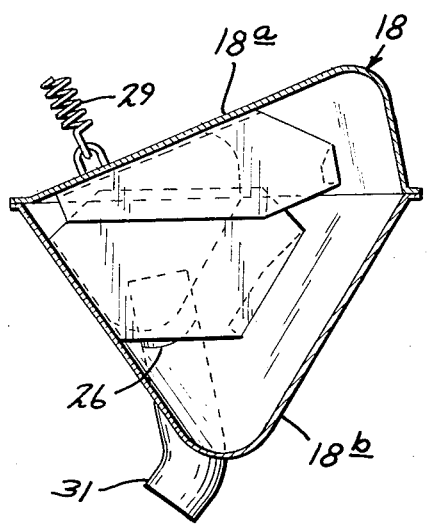
FIG. 3 is an enlarged sectional view taken along line 3—3 of FIG. 2, portions of the view having been removed.

An exhaust inlet tube 27 of predetermined length is mounted in intake opening 24 generally perpendicular to the adjacent surface of top wall portion 18a. In the preferred embodiment shown in the drawings, a bottom end of exhaust inlet tube 27 extends into the hollow muffler body, and an enlarged top end thereof extends above the top wall portion 18a. However, it should be understood that the bottom end of tube 27 need not extend into the muffler body but may terminate at opening 24. Inlet tube 27 is secured by welding or the like to opening 24 so that no exhaust gases can escape therebetween. The enlarged upper end of inlet tube 27 is in the form of a truncated hemisphere, and in particular that portion of a hemisphere lying between two parallel planes spaced apart a distance less than the spherical radius, with one of the planes extending through the center. Common joint 22 is constructed and arranged as previously described to closely fit into the enlarged top end of exhaust inlet tube 27. The outside surface of the lower half of common joint 22 sealingly engages the inner surface of the enlarged top end portion of tube 27 in any one of a plurality of angular relationships that are generally coaxial, one of said relationships being shown in FIG. 4. Because of this relationship, the muffler body can be twisted or turned with respect to the header unit 17 without destroying the effectiveness of the seal therebetween. As best shown in FIG. 2, a pair of springs 28 and 29 are connected between tubes 19 and 21 and top wall portion 18a to bias or pull the muffler body 18 upwardly against header unit 17 to hold the common joint 22 within the enlarged top end portion of exhaust inlet tube 27.

A pair of exhaust outlet tubes 30 and 31 are mounted in exhaust outlet openings 25 and 26 respectively. The top ends of the tubes 30 and 31 extend upwardly a short distance into the hollow muffler body, and the bottom portions of the tube extend through openings in the lower wall 14 of the engine compartment, so that exhaust gases are discharged beneath the snowmobile body.

With this construction, exhaust gases from the three cylinders are discharged through the pipes 19, 20 and 21 into the common joint 22 and exhaust inlet tube 27. The gases are thus discharged into the hollow muffler body, which may include a number of baffles to enhance sound attenuation, and is discharged from the muffler body through the pair of exhaust outlet tubes 30 and 31.

Figure 6:
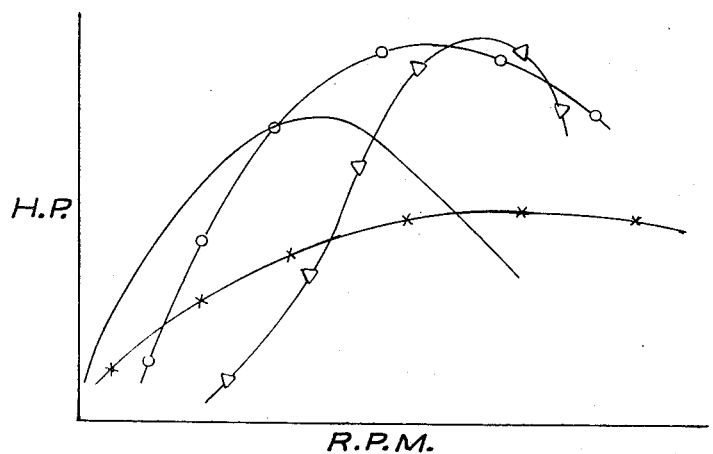
FIG. 6 is a graph comparing horsepower and engine revolutions for a typical two-cylinder engine having different types of exhaust systems.

The performance of this assembly is compared with prior art exhaust systems in FIG. 6. From FIG. 6, it can be seen that the poorest performance is obtained with a straight pipe connected to the exhaust port of the engine. The straight pipe neither enhances scavenging nor provides any supercharging. The use of a conic diffuser or megaphone improves the performance of the two-cycle engine as compared to the use of a straight pipe. The megaphone tends to create a negative pressure at the exhaust port at the correct time to enhance scavenging. This results in the improved performance of the engine reflected in FIG. 6. A tuned pipe may be designed to provide both scavenging and supercharging. As shown in FIG. 6, the tuned pipe can be used to greatly enhance two-cycle engine output over a selected, relatively narrow RPM range. The tuned pipe is designed to provide a back pressure wave that reaches the exhaust port at the correct time to supercharge the fresh charge carried by the cylinder. As shown in FIG. 6, I have found that the peak performance of an engine utilizing the present invention is almost as high as with a tuned pipe, and that this higher performance is present over a much wider RPM range than with the tuned pipe. Because the cylinders of a three-cylinder engine operate 120° apart, the peak exhaust pressure being generated by one cylinder is always being used to supercharge one of the other cylinders. This has previously been referred to as "pulse charging". With the particular design I have developed, this pulse charging occurs over a wide RPM range to enhance engine performance. In addition, it appears that the system described herein provides scavenging because of the venturi effect created by the high velocity gases passing through the common joint 22.

There are many variables in the present system that will change the performance of the engine. For example, the length of exhaust inlet tube 27, if changed, will change the shape of the power curve. Therefore, for any given engine size, it will be necessary to try different lengths and sizes in order to arrive at the desired performance curve. I have also found that performance is enhanced if the volume of the muffler body is approximately equal to the total displacement of the three cylinders. Therefore, for a 500 cc three-cylinder, two-cycle engine, the muffler can should be approximately 500 cubic inches in volume. In this type of system, the muffler is needed not only for sound attenuation, but also to provide a downstream restriction like a tuned pipe so that a pressure wave is forced back into each cylinder at the proper time. If there is no downward restriction, the pulse charging is not fully effective. I have also found that with this partiuclar system, the best performance is achieved by having a single exhaust inlet tube 27 and a pair of exhaust outlet tubes in the muffler body.

What is claimed is:

1. In a snowmobile having a forwardly located engine compartment with a three-cylinder two-cycle engine mounted therein, each of said cylinders having a separate exhaust port, a muffler assembly mounted in said compartment in front of said engine, comprising:

a. an elongated, hollow muffler body extending transversely of said compartment, said body having a centrally located exhaust intake opening in a top wall thereof, and having an exhaust outlet opening adjacent each end thereof in a bottom wall thereof;

b. an exhaust inlet tube of predetermined length having a bottom end thereof mounted in said intake opening, and an enlarged top end thereof extending above said top wall;

c. an exhaust outlet tube mounted in each of said exhaust outlet openings with a bottom portion of each extending through a lower wall of said engine compartment;

d. an exhaust header unit comprising three tubes of equal length each having one end connected to one of said exhaust ports, and the other ends being connected together into a common tubular joint, having inlet and outlet openings, at acute angles with respect to an axis extending through the center of said inlet and outlet openings, said common joint being constructed generally in the form of a truncated sphere with an upper inlet opening leading to said tubes and a lower outlet opening leading to said inlet tube;

e. said enlarged top end of said inlet tube being in the form of a truncated hemisphere; and f. spring means connected between said header unit and said body to yieldingly hold said common joint in engagement with said top end, whereby said common joint will sealingly engage said enlarged end in any one of a plurality of angular relationships that are generally coaxial, and whereby the exhaust gases from said engine pass through said header unit and inlet tube into said body for discharge through said outlet tubes.

2. The apparatus of claim 1 wherein said acute angles are 45 degrees or less.

* * * * *